(12) United States Patent
Meyer et al.

(10) Patent No.: US 10,391,691 B2
(45) Date of Patent: Aug. 27, 2019

(54) METHOD AND DEVICE FOR DEMOLDING ANNULAR ELASTOMER MOLDINGS FROM A MOLD CORE

(71) Applicant: Siegfried Meyer Bakum GmbH & Co. KG, Bakum (DE)

(72) Inventors: Siegfried Meyer, Vechta (DE); Reinhold Riewe, Bakum (DE)

(73) Assignee: Siegfried Meyer Bakum GmbH & Co. KG, Bakum (DE)

( * ) Notice: Subject to any disclaimer, the term of this patent is extended or adjusted under 35 U.S.C. 154(b) by 407 days.

(21) Appl. No.: 15/104,934

(22) PCT Filed: Dec. 12, 2014

(86) PCT No.: PCT/EP2014/077563
§ 371 (c)(1),
(2) Date: Jun. 15, 2016

(87) PCT Pub. No.: WO2015/091263
PCT Pub. Date: Jun. 25, 2015

(65) Prior Publication Data
US 2016/0318224 A1    Nov. 3, 2016

(30) Foreign Application Priority Data

Dec. 20, 2013 (EP) .................................... 13198945

(51) Int. Cl.
*B29C 33/42* (2006.01)
*B29C 33/44* (2006.01)
(Continued)

(52) U.S. Cl.
CPC ...... *B29C 45/4005* (2013.01); *B29C 45/2616* (2013.01); *B29C 45/332* (2013.01);
(Continued)

(58) Field of Classification Search
CPC ......... B29C 41/04; B29C 39/08; B29C 45/03; B29C 45/40; B29C 45/4005; B29C 45/44;
(Continued)

(56) References Cited

U.S. PATENT DOCUMENTS 4,958,676 A    9/1990   Kuntz
5,421,717 A *  6/1995   Hynds .................... B29C 45/262
                                                  264/334
7,828,541 B2 * 11/2010  Cude ........................ B29C 33/76
                                                  425/149
(Continued)

FOREIGN PATENT DOCUMENTS

DE    2115680    11/1971
DE    2825640    12/1979
(Continued)

*Primary Examiner* — Anthony Calandra
*Assistant Examiner* — S. Behrooz Ghorishi
(74) *Attorney, Agent, or Firm* — Thomas M. Freiburger

(57) ABSTRACT

The invention relates to a method and a device for demolding annular elastomeric molded parts from a mold core of an injection mold which has an inner mold core (1) and outer mold jaws and in which the molded parts (9) are produced parallel to one another in annular mold cavities (5) of the mold core (1). According to the invention, after removal of the outer mold jaws, the mold core (1), which contains the produced elastomeric molded parts (9) on the surface thereof, is set at such a high rotational speed about the longitudinal axis thereof that the internal diameter of the elastomeric molded parts (9) is increased because of centrifugal force to such an extent that the molded parts (9) are released from the mold cavities (5) and can be removed from the mold core (1) in the axial direction (10) while they are still rotating.

18 Claims, 3 Drawing Sheets

(51) Int. Cl.
*B29C 45/26* (2006.01)
*B29C 45/32* (2006.01)
*B29C 45/33* (2006.01)
*B29C 45/40* (2006.01)
*B29D 99/00* (2010.01)
*B29K 19/00* (2006.01)
*B29K 21/00* (2006.01)
*B29L 29/00* (2006.01)
*B29L 31/00* (2006.01)
*B29L 31/26* (2006.01)

(52) U.S. Cl.
CPC .......... *B29D 99/0085* (2013.01); *B29C 33/42* (2013.01); *B29C 33/44* (2013.01); *B29C 45/32* (2013.01); *B29C 45/33* (2013.01); *B29C 45/40* (2013.01); *B29K 2019/00* (2013.01); *B29K 2021/00* (2013.01); *B29K 2021/006* (2013.01); *B29L 2029/00* (2013.01); *B29L 2031/26* (2013.01); *B29L 2031/7096* (2013.01)

(58) Field of Classification Search
CPC ... B29C 45/332; B29C 45/33; B29C 45/2616; B29C 45/26; B29C 33/42; B29C 45/32; B29C 33/44; B28B 1/28; B28B 1/20
See application file for complete search history.

(56) References Cited

U.S. PATENT DOCUMENTS

| | | | | |
|---|---|---|---|---|
| 2010/0063172 | A1* | 3/2010 | Negle | B29C 39/006 521/142 |
| 2013/0202728 | A1* | 8/2013 | Maenner | B29C 45/03 425/169 |

FOREIGN PATENT DOCUMENTS

| | | | | |
|---|---|---|---|---|
| DE | 3023447 | | 1/1982 | |
| DE | 3306513 | | 8/1984 | |
| GB | 1465403 | | 2/1977 | |
| GB | 1465403 A | * | 2/1977 | ............. B29C 33/00 |
| JP | S54106567 | * | 8/1979 | ............. B29C 33/00 |

* cited by examiner

METHOD AND DEVICE FOR DEMOLDING ANNULAR ELASTOMER MOLDINGS FROM A MOLD CORE

BACKGROUND OF THE INVENTION

The invention relates to a method for demolding annular elastomeric molded parts from a mold core according to the preamble of claim 1 and to a device for carrying out such a method according to the preamble of claim 9.

The invention relates to a method for demolding annular elastomeric molded parts from a mold core according to the preamble of claim 1 and to a device for carrying out such a method according to the preamble of claim 9.

Nowadays, the production of elastomeric molded parts, in particular open rubber rings, takes place predominantly in an injection molding process, wherein a plurality of mold cavities in the form of half-shells arranged parallel on a mold core are molded. The counter-molds, as mold jaws fitted onto the mold core from the exterior, likewise contain mold cavities in the form of half-shells so that, with the mold jaws fitted on, annular mold cavities are produced into which rubber or plastic materials can be introduced which, after vulcanization, form annular molded parts. These are used in particular in waste water technology.

For demolding of the molded parts from the injection mold, first of all the outer mold jaws are removed from the mold core and then the molded parts, of which half of each one still remains in the mold cavities of the mold core, must be extracted from the mold core. Because of their elastomeric characteristics the molded parts are generally pulled in the longitudinal direction over the surface of the mold core and removed from the free end thereof.

From DE-OS 21 15 680 a stripping device is known which contains belts running in the axial direction of the mold core which are driven in opposite directions so that the stripping belts move to the free end of the mold core during the stripping operation and thus push the molded parts over the mold core.

DE 30 23 447 discloses a similar stripping device which is in each case designed as a rigid elongate body which can move in the stripping direction, set at an angle to the circumference of the rings to be stripped out, parallel to the axis of the mold core, and which can move back freely against the stripping direction. It is also known from this document that the stripping of the rings can be carried out alternatively by means of a compressed air device.

Finally, a similar device is known from DE 33 06 513, in which the stripper has a hook which engages behind the last ring in order to simplify the stripping.

Basically in all the aforementioned devices it is necessary that, for stripping, the rings have to be guided from the location where they are produced on the mold core, over the mold core to the free end of the mold core, wherein the mold cavities located along the extraction path are either still filled or are already empty. In any case the rings are pulled over a surface provided with troughs and peaks, which brings with it the great risk that the rings can be damaged or, in particular in the event of a greater diameter or a non-circular mold, become intertwined, so that after-treatment of the rings is necessary. A further disadvantage is that the illustrated stripping devices are difficult to set, since if the pressure on the molded parts is too low the devices are not capable of stripping out the molded parts over the entire displacement path, and if the pressure is too high the devices can cause damage to the rings. Furthermore, the mold cores are subjected to substantial wear, which is caused by abrasion of the stripper on the mold core.

Therefore, the object of the invention is to provide a method for demolding annular elastomeric molded parts from a mold core, wherein the molded parts can be extracted in a simple manner and very carefully from the mold core, wherein a rotation of the molded parts is avoided and the wear on a mold core is considerably reduced.

A further object of the invention is to provide a device for demolding annular elastomeric shaped parts that is constructed in a simple manner, avoids after-treatment of the molded parts and can be produced cost-effectively.

These objects are achieved by the invention set out in claims 1 and 9. Advantageous embodiments of the invention are set out in the subordinate claims.

SUMMARY OF THE INVENTION

The invention relates to a method for demolding elastomeric molded parts from a mold core of an injection mold which has an inner mold core and outer mold jaws and in which the molded parts are produced parallel to one another in annular mold cavities of the mold core.

The invention relates to a method for demolding elastomeric molded parts from a mold core of an injection mold which has an inner mold core and outer mold jaws and in which the molded parts are produced parallel to one another in annular mold cavities of the mold core.

According to the invention, after the production of the produced elastomeric molded parts and removal of the external mold jaws the mold core is rotated about its longitudinal axis at a rotational speed in such a way that the internal diameter of the elastomeric molded parts is increased due to centrifugal force to such an extent that they are released from the mold cavities. They are removed even during their rotation and expansion in the axial direction from the mold core.

In contrast to the prior art in which the mold core is of static construction, after the formation of the molded parts the mold core according to the invention is brought by a motor drive to such a high speed of rotation that the centrifugal forces generated thereby which act on the molded parts lead to the molded parts being gradually released from the mold cavities and then being easily removable, in particular by means of a suitable extracting device, from the mold core.

If the mold core for demolding is oriented substantially horizontally, an extracting or pushing device is necessary which removes the produced rotating rings from the mold core. However, if the mold core is oriented horizontally at an angle or vertically, after demolding from the mold cavities the rotating rings may also fall under their own weight from the mold core without additional help and may be transferred to a receiving device.

When the mold core rotates at high speed, the molded parts are released initially on one side from the mold cavities. As a result, they acquire a predominantly oval shape as they spin around the mold core. In order to bring them into a substantially circular form during the rotation, they are preferably pushed back towards the mold core by a guide rod arranged parallel to the axis of the mold core, so that the oval shape is decreased and while the rings are rotating they are brought into a substantially circular structure which is oriented concentrically with respect to the mold core.

In order to prevent the molded parts, which are rotating at high speed, from being braked by the guide rod, it may be provided that the guide rod itself is set in rotation in the opposite direction to the mold core, so that although it brings about the formation of the circular shape of the rings it does not cause braking of the rings, so that their diameters remain substantially unchanged with the high speed maintained.

In order to be able to effect shifting of the rings in the extraction direction, the guide rod is preferably provided with obliquely extending guide grooves. It can also have a brush-like structure which is arranged spirally around the guide rod, so that as it rotates a lateral pressure pulse can be applied to the rotating molded rings and moves them in the direction of the extraction end of the mold core.

The rate of rotation of the mold core depends upon a series of parameters, in particular the diameter, the cross-section and the elasticity of the molded parts, the temperature and/or the cross-sectional shape of the mold cavities. Since the cross-sectional shape of the mold cavities corresponds to the cross-section of the molded parts, it may be necessary in some cases to increase the speed relative to the speed of the rings which are round in cross-section, in order also to be able to release non-round rings or rings with lip seals from the mold cavities.

The speed of rotation is chosen to be so great that all the rings produced on a mold core can be extracted from the mold core without additional mechanical expansion. Thus as an alternative to extraction with contact by means of brushes or guide tracks the possibility exists that the mold cores move by means of pulses of compressed air in the direction of the extraction end of the mold core.

In an alternative embodiment it may also be provided that after the production of the molded parts a bushing is pushed onto the mold core with the molded parts, the internal diameter of said bushing having a spacing from the external diameter of the mold core which is greater than the cross-sectional diameter of the molded parts. The bushing is preferably driven at the same speed as the mold core, which leads to that, with the result, that if the molded parts are released from the mold cavities the molded parts put with their external circumference against the inner face of the rotating bushing. So long as a high speed of rotation of the bushing is maintained, the rings also remain adhered to the inner face thereof. In this case the mold core can be moved out of the bushing so that then the speed of rotation of the bushing can be reduced, and then the rings can fall out of the bushing or can be withdrawn therefrom.

A device suitable for carrying out such a method has a mold core which can be brought to a high speed by means of a by motor-powered drive. For this purpose, the mold core can be coupled to a rotary drive or can also be fixedly connected to a drive motor. Since a mold core can certainly have a length of up to 1 meter, it is preferable that during the rotation the free end of the mold core is fitted onto a mandrel which takes up the eccentricities of the mold core during rotation. At the same time the mandrel can form the receiving mandrel of the rings extracted from the mold core.

In order to bring the molded parts on the mold core into a central position relative to the mold core at the high speed of rotation, a guide rod arranged parallel to the mold core can be provided which is either at a fixed distance from the mold core or at a variable distance from the mold core, wherein with the mold core arranged horizontally the guide rod is located below the mold core in order to shift the axis of rotation of the molded parts towards the axis of rotation of the mold core.

The method according to the invention creates the possible option of a particularly careful extraction of the molded parts from a mold core. It avoids damage and also prevents twisting of the molded parts, such as occurs in extracting devices according to the prior art. No wear occurs on the mold core. The molded parts cannot twist inherently and a plurality of molded parts will not one become entangled in one another. In this way all molded parts can also be set down in the same direction, so that no subsequent sorting or aligning of the molded parts is necessary.

The invention is applicable to all elastomeric molded parts which are closed in the form of a ring, in particular made of rubber-like or silicone rubber-like materials, including circular, oval, rectangular shapes, which can also have a different cross-sectional extent in the axial and radial direction. Therefore, it is also possible to produce sealing sleeves directly in annular form without having to bond them as extruded profiles into the form of a ring.

DESCRIPTION OF THE DRAWINGS

The invention is explained in greater detail below with reference to an embodiment. In the drawings:

The invention is explained in greater detail below with reference to an embodiment. In the drawings:

FIG. 5 shows a guide rod which is connected to a compressed air source and conveys the molded parts in the extraction direction by means of compressed air.

DESCRIPTION OF PREFERRED EMBODIMENTS

Figure 1:
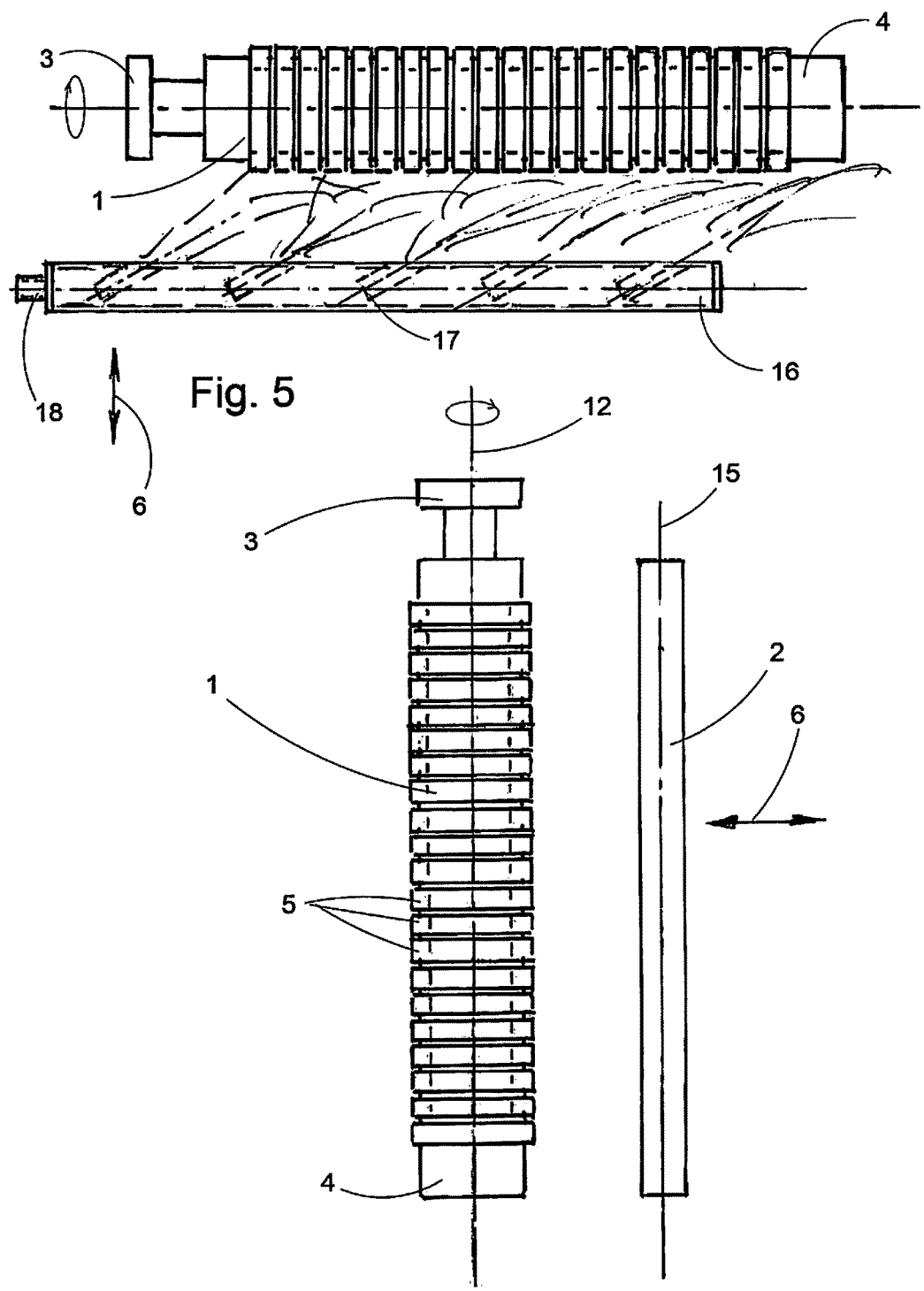
FIG. 1 shows a vertically oriented mold core with a guide track which is arranged parallel thereto and can be moved in the radial direction with respect to the mold core.

The vertically directed mold core 1 illustrated in FIG. 1 contains a series of mold cavities 5, in which molded parts (not shown), in particular sealing rings of round cross-section, for example with a diameter of 100 mm, are molded. The mold core 1 is connected by means of a suitable coupling device 3 to a rotary drive, or it may already be connected in the injection molding machine to a rotary drive, wherein in this situation a horizontal arrangement is generally considered. By means of the rotary drive the mold core 1 is brought to a high speed of rotation, which with a diameter of the molded parts of 100 mm amounts to approximately 2,000 to 3,000 r.p.m. With smaller diameters the rotational speed may be chosen to be correspondingly higher. Thus the choice of the rotational speed depends upon the cross-sectional shape of the molded parts and the modulus of elasticity of the molded parts. The smoother and more flexible the molded parts are, the lower the chosen speed can be. However, the speed must be chosen to be so great that the molded parts can be released from the mold cavities 5 by centrifugal force.

The vertically directed mold core 1 illustrated in FIG. 1 contains a series of mold cavities 5, in which molded parts (not shown), in particular sealing rings of round cross-section, for example with a diameter of 100 mm, are molded. The mold core 1 is connected by means of a suitable coupling device 3 to a rotary drive, or it may already be connected in the injection molding machine to a rotary drive, wherein in this situation a horizontal arrangement is generally considered. By means of the rotary drive the mold core 1 is brought to a high speed of rotation, which with a diameter of the molded parts of 100 mm amounts to approximately 2,000 to 3,000 r.p.m. With smaller diameters the rotational speed may be chosen to be correspondingly higher. Thus the choice of the rotational speed depends upon the cross-sectional shape of the molded parts and the modulus of elasticity of the molded parts. The smoother and more flexible the molded parts are, the lower the chosen speed can be. However, the speed must be chosen to be so great that the molded parts can be released from the mold cavities 5 by centrifugal force.

Since at elevated speeds the molded parts are initially released from the mold cavities 5 on one side of the mold core, they assume an oval shape which generally prevents the molded parts from being extracted from the mold core without further action. Therefore, a guide rod 2 is advanced in the radial direction 6 towards the mold core 1 which forces the revolving molded parts at their maximum radius back to the mold core axis 12. In this way the molded parts are restored again to a substantially concentric annular shape, so that they virtually have no more contact with the mold core and therefore can fall out of the mold core 1 under their own weight or can be extracted therefrom.

Figure 2:
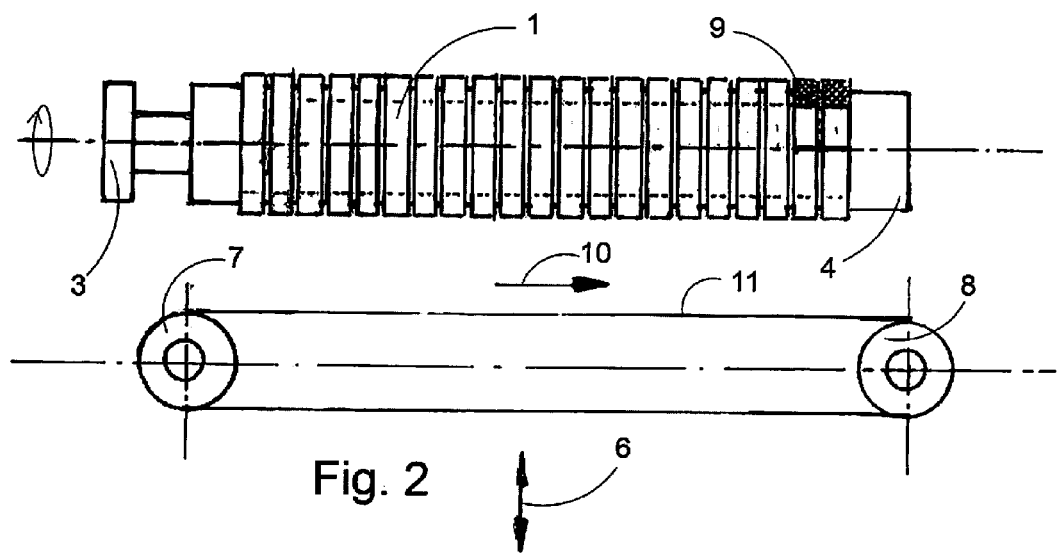
FIG. 2 shows a horizontally oriented mold core with an extraction belt which is oriented and driven parallel thereto, and can be advanced in the radial direction from below to the mold core.

FIG. 2 shows a horizontal arrangement of a mold core 1, which is brought to a high rotational speed by means of a coupling device 3. In this embodiment, the revolving molded parts are extracted from the mold core 1 in the extraction direction 10 by means of an extraction device, consisting predominantly of two deflection rollers 7 and 8 as well as an extraction belt 11. For this purpose, the extraction device is advanced slowly in the radial direction 6 from below to the mold core 1 until the extraction belt lightly contacts the molded parts. The contact momentum influences the position of the molded parts 9 so that they are pressed out of the mold cavities of the mold core not only in the main direction of expansion, but also in the rest of the area. The molded parts are then guided in succession to the extraction end 4 of the mold core 1 by the extraction device and can then be fed onto a collecting mandrel. This collecting mandrel can serve simultaneously for centering and stabilizing the mold core which is rotating at high speed.

Figure 3:
FIG. 3 shows a plan view of a rotatable guide rod having a spiral surface structure which as it rotates causes a thrust in the direction of the extraction end of the molded part.

FIG. 3 shows an embodiment of a guiding track 14 with spirally extending depressions 13, which during the rotation exerts a pushing movement on the molded parts touching the guide track. Instead of a guide track 14 with circumferential depressions 13 it is also possible to use a guide track which has a circumferential brush arrangement, which can likewise be of spiral design, so that the molded parts can be extracted from the mold core by means of the brushes.

Figure 4:
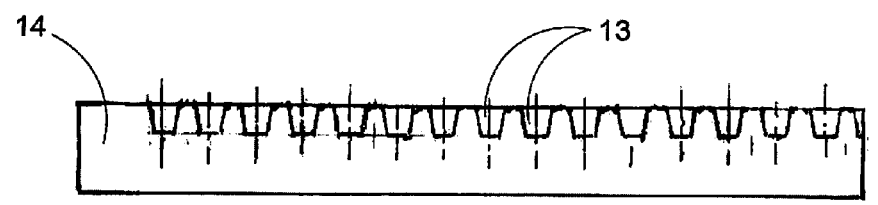
FIG. 4 shows a sectional view of FIG. 3.

FIG. 4 shows the guide track 14 in cross-section with depressions 13.

In order to prevent the molded parts from losing their rotational speed when colliding with the guide track it may be provided that the guide track itself is set in rotary movement about is axis (15 in FIG. 1) which is opposed to the direction of rotation of the mold core, so that even when the molded parts collide with the guide track the speed of rotation of the molded parts is not decreased.

FIG. 5 shows the arrangement of a mold core 1 with a nozzle holder 16 which can be advanced laterally towards the mold core 1 and contains a plurality of outlet nozzles 17, which apply a jet of compressed air in the direction of the mold core 1, and is connected to a compressed air source 18. Thus the molded parts are blown down from the mold core when the nozzle directions are at an oblique angle in the direction of the extraction end 4 of the mold core.

Figure 6:
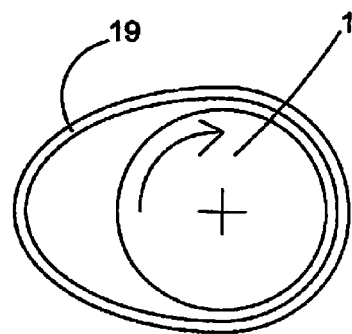
FIG. 6 shows a cross-sectional representation of a mold core with a molded part which is brought to a high speed of rotation.

FIG. 6 shows a view of a detail of a mold core 1 which is driven at high speed and on which a molded part 19 revolves. It can be clearly seen that the molded part 19 takes on an oval shape.

Figure 7:
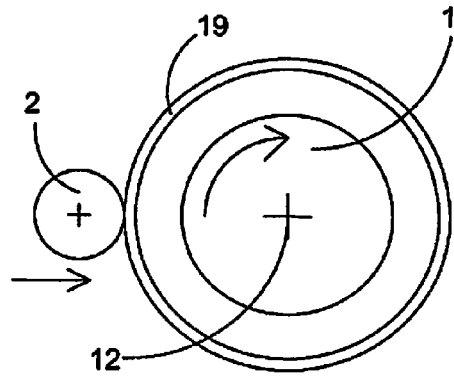
FIG. 7 shows the type of deformation of the mold core when the guide rod is advanced laterally towards the mold core.

FIG. 7 shows the same embodiment with the advanced guide rod 2, which forces the molded part back in the direction of the axis of rotation 12 of the mold core 1. At a sufficiently high speed of rotation of the molded part 19, its internal diameter is greater than the external diameter of the mold core 1 due to the centrifugal force. As a result, when the high speed is maintained the molded part can be easily withdrawn from the mold core or with a corresponding vertical or oblique arrangement of the mold core the molded part 16 can also fall down automatically from the mold core 1.

Figure 8:
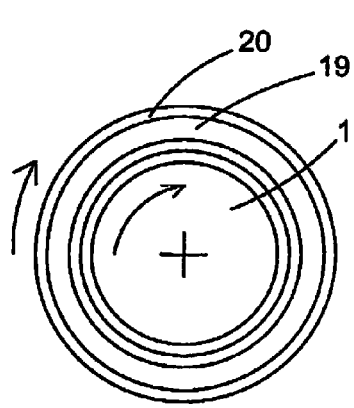
FIG. 8 shows a second embodiment with a bushing arranged around the mold core.
Figure 9:
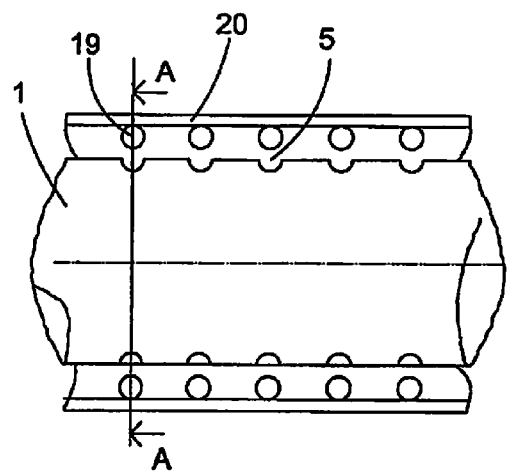
FIG. 9 shows a sectional view along the line A-A in FIG. 8 with a representation of the molded parts which at a high speed of rotation bear against the inside of the bushing.

FIG. 8 shows an alternative embodiment of the device according to the invention, in which instead of a guide rod 2 a bushing 20 is used, of which the internal diameter has a spacing from the external diameter of the mold core 1 which is greater than the cross-sectional diameter of a molded part 19. If both the molded part 1 and also the bushing 20 are rotated at a high speed, the molded parts 19 come out of the mold cavities 5 of the mold core 1 and lie against the inner face of the bushing 20. If the speed of the bushing is maintained, the molded parts 19 also remain lying against the inner face of the bushing 20. Then the mold core 1 can be pushed or pulled out of the bushing. FIG. 9 shows a corresponding representation in a longitudinal view.

LIST OF REFERENCE NUMERALS 1 mold core
2 guide rod
3 coupling device
4 extraction end
5 mold cavities
6 radial direction
7 deflecting roller
8 deflecting roller
9 molded part
10 axial direction
11 extraction belt
12 axis of rotation
13 depression
14 guide track
15 axis of rotation
16 nozzle holder
17 nozzle
18 compressed air supply
19 molded part
20 bushing

The invention claimed is:
1. A method for demolding annular elastomeric molded parts from a mold core (1) of an injection mold which has the mold core (1) and outer mold jaws and in which the molded parts (9, 19) are produced parallel to one another in a series of annular mold cavities (5) of the mold core (1), comprising the steps of:

after removal of the outer mold jaws, the mold core (1), which contains the produced elastomeric molded parts (9, 19), which are open rings, on the surface thereof, is set at such a high rotational speed about the longitudinal axis (12) thereof that the internal diameter of the elastomeric molded parts (9, 19) is increased because of centrifugal force to such an extent that the open ring molded parts (9, 19) are released from the mold cavities (5) and can be removed from the mold core (1) in an axial direction (10) relative to the mold core, parallel to said longitudinal axis while still rotating.

2. The method according to claim 1, characterized in that during the rotation of the open ring molded parts (9, 19) on the mold core (1) and after demolding thereof from the mold cavities (5) said open ring molded parts are removed from the mold core (1) by means of an extracting device.

3. The method according to claim 1, characterized in that the axis of rotation (12) of the mold core (1) during rotation of the latter is oriented at an angle to the horizontal plane, and that during the rotation of the open ring molded parts (9, 19) on the mold core (1) and after demolding thereof from the mold cavities (5) said open ring molded parts fall from the mold core (1) under their own weight.

4. The method according to claim 1, characterized in that during the rotation of the open ring molded parts (9, 19) and after demolding thereof from the mold cavities (5) said molded parts are brought into a substantially central position with respect to the axis of rotation of the mold core by at least one guide rod (2) arranged parallel to the axis of the mold core (1).

5. The method according to claim 4, characterized in that the at least one guide rod (2) is set in rotation in the opposite direction to the mold core (1) and its circumferential speed corresponds substantially to the circumferential speed of the mold core (1).

6. The method according to claim 1, characterized in that after the removal of the mold jaws a rotatable bushing (20) which is mounted axially relative to the mold core (2) is guided over the mold core (1), the internal diameter of said bushing having a spacing from the external diameter of the mold core (1) greater than the cross-sectional diameter of the open ring molded parts (9, 19), and that the bushing (20) is driven at substantially the same speed as the mold core (1) or at a higher speed, wherein after release of the open ring molded parts (9, 19) from the mold cavities (5) the mold core (1) is removed from the bushing (20) before the speed of rotation of the bushing (20) is reduced.

7. The method according to claim 1, characterized in that the speed of rotation of the mold core (1) is chosen as a function of its diameter, the cross-section of the open ring molded parts, the elasticity of the open ring molded parts, the temperature of the mold cavities, and/or the cross-sectional shape of the mold cavities (5).

8. The method according to claim 1, characterized in that the open ring molded parts (19) are transferred to a receiving mandrel after the removal of the mold core (1).

9. A device for demolding annular elastomeric molded parts from a mold core of an injection mold comprising an inner mold core (1) and outer mold jaws for carrying out the method according to claim 1, wherein the mold core (1) has a series of annular mold cavities (5) which are formed parallel to one another on the external circumference of the mold core (1) and in which in collaboration with the external mold jaws the elastomeric open ring molded parts can be formed, characterized in that the mold core (1) is designed to be rotatable about its longitudinal axis (12) and, after removal of the outer mold jaws, can be driven at such a circumferential speed that open ring molded parts (19) formed in the mold cavities (5) are released from the mold cavities (5) by centrifugal force and can be removed from the mold core (1) in the axial direction.

10. The device according to claim 9, characterized in that a guide rod (2) is provided which, by lateral advance towards the mold core (1), brings the open ring mold parts (19) revolving thereon into a substantially central position relative to the axis of rotation of the mold core (1).

11. The device according to claim 10, characterized in that the guide rod (2) is designed as an extracting device, with the aid of which the open ring molded parts (19) released from the mold cavities (5) can be withdrawn in the longitudinal direction of the mold core (1).

12. The device according to claim 11, characterized in that the extracting device has a spiral surface structure and is designed to be rotatable.

13. The device according to claim 11, characterized in that the extracting device has a brush-like surface structure.

14. The device according to claim 11, characterized in that the extracting device contains a circulating extracting belt (11) which acts in the axial direction (10) of the mold core (1).

15. The device according to claim 11, characterized in that the extracting device is connected to a compressed air source (18), and that the extracting device contains outlet nozzles which are directed obliquely against the revolving open ring molded parts (19) in such a way that, while the open ring molded parts (19) are rotating they are guided by means of compressed air to the outlet end of the mold core (1).

16. The device according to claim 9, wherein the mold core (1) is oriented substantially horizontally.

17. The device according to claim 9, characterized in that during the rotation the mold core (1) is oriented at an angle to the horizontal.

18. The device according to claim 9, characterized in that a bushing (20) is provided which, after removal of the outer mold jaws, can be guided coaxially over the mold core (1) and can be driven together with the mold core (1), wherein the internal diameter of the bushing (20) has a spacing from the external diameter of the mold core (1) which is greater than the cross-sectional diameter of the open ring molded parts (19), and that the mold core (1) can be removed from the bushing (20) during the rotation of the latter.

\* \* \* \* \*